United States Patent
Sarpola et al.

[11] Patent Number: 5,848,138
[45] Date of Patent: Dec. 8, 1998

[54] METHOD FOR TRANSMITTING TARIFF DATA TO A SUBSCRIBER UNIT

[75] Inventors: Jussi Sarpola; Vesa Heikkilä; Ari-Pekka Taskila; Hannu Asujamaa; Heimo Pentikäinen; Olli Liinamaa, all of Oulu; Pekka Rusi, Isokyro; Seppo Vehmer, Vantaa, all of Finland

[73] Assignee: Nokia Telecommunications Oy, Espoo, Finland

[21] Appl. No.: 676,395

[22] PCT Filed: Jan. 23, 1995

[86] PCT No.: PCT/FI95/00031

§ 371 Date: Jul. 22, 1996

§ 102(e) Date: Jun. 22, 1996

[87] PCT Pub. No.: WO95/20298

PCT Pub. Date: Jul. 27, 1995

[30] Foreign Application Priority Data

Jan. 24, 1994 [FI] Finland .................................. 940339

[51] Int. Cl.$^6$ .................................................. H04M 15/00
[52] U.S. Cl. ........................ 379/114; 379/144; 455/406; 455/407; 455/409
[58] Field of Search ..................... 379/143–144, 379/146, 151, 154–155, 131–132, 124, 128, 111–114; 455/465, 407–408, 406–409

[56] References Cited

U.S. PATENT DOCUMENTS

| | | | |
|---|---|---|---|
| 4,640,986 | 2/1987 | Yotsutani et al. | 455/407 |
| 5,046,085 | 9/1991 | Godsey et al. | 455/407 |
| 5,109,401 | 4/1992 | Hattori et al. | 455/407 |
| 5,233,642 | 8/1993 | Renton | 455/408 |

*Primary Examiner*—Forester W. Isen
*Assistant Examiner*—Duc Nguyen
*Attorney, Agent, or Firm*—Pillsbury Madison & Sutro LLP

[57] ABSTRACT

The invention relates to a method for transmitting tariff data via radio-frequency signals to a chargeable subscriber unit (1) communicating with a telecommunication network (7). In order to charge the user of the subscriber unit as fairly as possible, a tariff frame corresponding to a lump sum is transmitted to the subscriber unit (1), charge-metering signals received from the telecommunication network (7) are counted, and when the monetary value corresponding to the number of the counted charge-metering signals exceeds a predetermined threshold value, a new tariff frame corresponding to a lump sum is transmitted to the subscriber unit (1). The invention also relates to a system where the method according to the invention can be applied.

11 Claims, 1 Drawing Sheet

METHOD FOR TRANSMITTING TARIFF DATA TO A SUBSCRIBER UNIT

BACKGROUND OF THE INVENTION

1. Field of the Invention

The invention relates to a method for transmitting tariff data via radio-frequency signals to a chargeable subscriber unit communicating with a telecommunication network. The invention also relates to a radio system providing a wireless local loop, the system comprising at least one base station, a subscriber network element and subscriber units, the subscriber network element comprising means for transmitting telecommunication signals between the telecommunication system and the subscriber units.

The invention relates to transmitting tariff data via radio signals to a chargeable subscriber unit, such as a pay phone, connected to a telecommunication network. The invention relates in particular to a WLL system, i.e. a radio system providing a wireless local loop, in which system the subscriber units are connected with a radio connection via base stations to a public switched telephone network (PSTN). Any conventional type of telephone set can be connected to the WLL system by means of a special terminal equipment, the radio path being thus invisible for the user.

2. Description of the Related Art

A subscriber unit refers to the equipment the subscriber has for transmitting and receiving telecommunication signals, i.e. in the case of a WLL system, the subscriber unit comprises a WLL terminal equipment consisting of a radio part and a teleadapter (to which the user interface, e.g. a telephone, is connected), and a user interface, such as a telephone, a telefax terminal, a computer/modem combination or the like, connected to the terminal equipment. In this connection, a chargeable subscriber unit refers to a subscriber unit which charges the user a fee immediately during the use, and, in most cases, at least partly in advance. This kind of chargeable subscriber unit is, for example, one which comprises a user interface, such as a pay phone or a telefax terminal, operated by coins, credit cards or other similar means of payment.

When chargeable subscriber units are used, the system has to be able to charge the user of the subscriber unit during the use. An arrangement used with the chargeable telephone sets of, for example, the NMT-450 system is previously known. In this arrangement a tariff frame is transmitted via a radio path to the pay phone when the connection is established, and the phone charges the user of the phone on the basis of this tariff frame independently during the entire call. One drawback of this known arrangement is, however, that tariff changes possibly occurring during the call cannot be taken into consideration. It is common that the operator determines, for example, a special evening tariff, which may differ considerably from the day-time tariff. However, the known arrangement described above cannot take into consideration the possible change of the tariff during the call, wherefore the user of the pay phone may have to pay considerably more (or less) for the call than that which the operator actually considers to be the correct price for the call. In other words, the price of the call calculated by the telephone exchange may differ considerably from the amount of money the pay phone charges the user.

SUMMARY OF THE INVENTION

The purpose of the present invention is to solve the aforementioned problem and to provide a method for transmitting tariff data to a chargeable subscriber unit in such a way that the user of the unit could be charged as fairly as possible. These aims are achieved with the method according to the invention, which is characterized in that a tariff frame corresponding to a lump sum is transmitted to the subscriber unit, charge-metering signals received from the telecommunication network are counted, and when the monetary value corresponding to the number of the counted charge-metering signals exceeds a predetermined threshold value, a new tariff frame corresponding to a lump sum is transmitted to the subscriber unit.

The invention is based on the idea that the use of a chargeable subscriber unit can be charged in as fair and functional a manner as possible when the charging is based, during the entire connection, on charge-metering pulses obtained from the telecommunication network, i.e. preferably from the phone network, and when the user is always charged in advance a lump sum corresponding to a certain number of the pulses. The most important advantage of the method according to the invention, is that tariff changes may be taken into account for ongoing calls at the moment the tariffs are changed, since the tariff frame is repeatedly transmitted to the pay phone during the entire call, and the tariff frame to be transmitted can be changed to another tariff frame with a different fee at the moment of tariff-changing determined by the operator.

In the method according to the invention, the operator can determine, separately for each case, the lump sum that the user has to pay for each transmitted tariff frame. This is highly significant for the quality of the call, since each tariff frame transmitted via the radio path during the call causes an interruption in the speech path, and therefore the higher the sums of money the user is charged each time, i.e. the more seldom the tariff frame is transmitted, the better the quality of the call.

The invention also relates to a system where the method according to the invention can be applied. The system, according to the invention, is characterized in that the system comprises at least one chargeable subscriber unit, a counter arranged in connection with the subscriber network element to count the charge-metering signals transmitted by the telecommunication system, a memory device arranged in connection with the subscriber network element to indicate the tariff frame corresponding to the set of numbers dialed by the chargeable subscriber unit, subscriber network element comprising means, responsive to the counter, arranged to retrieve from the memory device the tariff frame to be transmitted to the chargeable subscriber unit when the connection is established and when the monetary value corresponding to the number of the charge-metering signals counted by the counter exceeds a predetermined threshold value.

The preferred embodiments of the method and the system according to the invention are disclosed in the appended dependent claims 2, 3, and 5 to 7.

DESCRIPTION OF THE PREFERRED EMBODIMENTS

Figure 1:
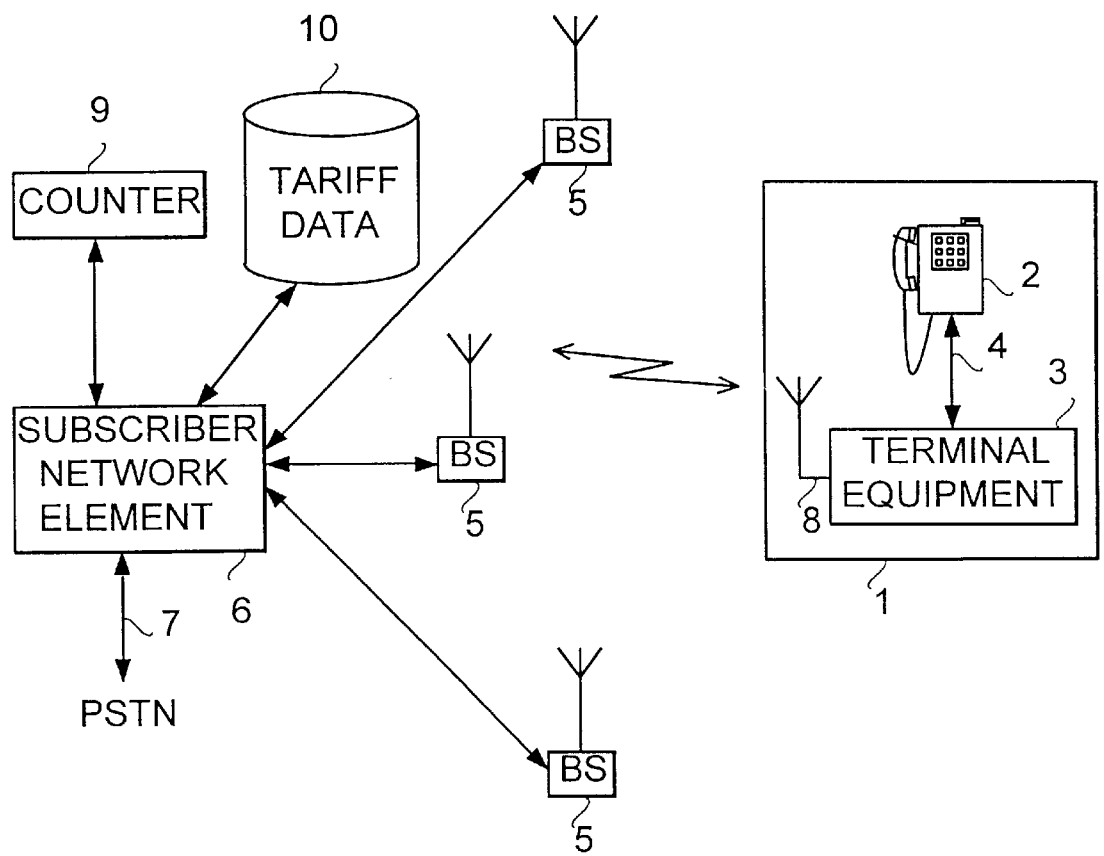
FIG. 1 is a block diagram of a part of a WLL system where the method, according to the invention, can be applied.

In the following, the invention will be described by means of its first preferred embodiment with reference to FIG. 1, which is a block diagram of a part of a WLL system where the method according to the invention can be applied. FIG.

1 shows a chargeable subscriber unit 1 of the WLL system, the unit comprising a pay phone 2, i.e. a coin-operated telephone, and a terminal equipment 3. The pay phone 2 shown in the figure is an ordinary pay phone which can be connected to the public telephone network by means of a two-wire lead and operated with metering pulses of 12 kHz or 16 kHz. Instead of the phone 2, the system shown in FIG. 1 could equally well employ some other ordinary user interface, for example a telefax terminal operated by coins, credit cards or other similar means of payment, connected to the public phone network by means of a two-wire lead.

The pay phone 2 and the terminal equipment 3 are connected in FIG. 1 by a two-wire lead 4, through which telecommunication signals can be transmitted between the terminal equipment and the phone. The terminal equipment 3 comprises signal-processing means for adapting a speech path to a radio channel. Such signal-processing means are e.g. a radio part comprising an antenna 8, a radio transmitter and a radio receiver, and a teleadapter, which adapts the radio part to an ordinary telephone set 2.

The subscriber unit 1 is connected by radio-frequency signals via the antenna 8 to a base station 5 (FIG. 1 shows three base stations BS), through which the calls are transmitted, via a subscriber network element 6, to the public switched telephone network (PSTN), i.e. to the fixed telephone network 7. The base stations 5 correspond to the parts of the NMT-450 cellular radio system (Nordisk Mobil Telefon). As far as signalling is concerned, the subscriber unit 1 operates like a normal mobile phone of the NMT-450 system.

For the purpose of charging the user of the pay phone 2 for the phone services he has used, a counter 9 and a tariff frame database 10 are provided to the subscriber network element 6, shown in FIG. 1. In the beginning of a call made from the pay phone 2, the base station controller 6 retrieves from the database 10, on the basis of the dialed phone number, a tariff frame Q1Q2 which corresponds to the tariff determined by the operator for that particular area code. The content and the meaning of the tariff frames Q1Q2 are defined for example in the specifications of the NMT-450 system, according to which they may contain both price/second data, such price data corresponds to a lump sum and can be used according to the invention (i.e. price/transmitted frame).

Immediately in the beginning of a call made from the pay phone 2, the subscriber network element 6 retrieves from the tariff frame database 10 the tariff frame Q1Q2 on the basis of the set of numbers and the time (day/evening tariff), and transmits the frame through the base station 5 via a radio path to the subscriber unit 1. After this, the counter 9 begins counting the charge-metering pulses transmitted from the PSTN. When the monetary value corresponding to the number of the pulses exceeds a certain predetermined sum, which is preferably the same as the lump sum corresponding to the value of the transmitted tariff frame, the subscriber network element 6 again retrieves a tariff frame Q1Q2 from the tariff frame database 10 on the basis of the set of numbers and the time, and transmits the frame to the subscriber unit 1. The latter tariff frame to be transmitted may thus be the same as or different from the tariff frame first transmitted depending on whether the tariff used has changed or remained the same (day/evening tariff).

The terminal equipment 3, included in the subscriber unit 1, comprises a signal generator, by means of which the terminal equipment can simulate the metering pulses of 12 or 16 kHz generally used in the PSTNs. After the terminal equipment 3 has received the tariff frame Q1Q2 transmitted via the base station 5, it generates an amount of metering pulses, depending on the amount of the tariff, and transmits these pulses via a two-wire lead 4 to the pay phone 2. The pay phone, in turn, immediately charges the user on the basis of the number of the pulses it has received. The user of the pay phone 2 is thus always charged the lump sum determined by the operator. The operator in advance determines the amount of the lump sum by changing the values in the tariff frame database 10.

It must be understood that the above specification and the figure related thereto are only meant to illustrate one preferred embodiment of the method and the system according to the invention without restricting the invention itself thereto. Thus the method according to the invention can naturally be applied also in other system besides the WLL systems, for example, in some cellular radio system. Therefore the preferred embodiments of the method and the system according to the invention may vary within the scope of the appended claims.

We claim:

1. A method for transmitting tariff data via radio-frequency signals to a chargeable subscriber unit communicating with a telecommunication network, the method comprising:

transmitting a first tariff frame to the chargeable subscriber unit, the first tariff frame corresponding to a first tariff rate for at least a portion of a call;

counting charge-metering signals received from the telecommunication network; and transmitting a second tariff frame to the chargeable subscriber unit when a monetary value, corresponding to a number of the counted charge-metering signals counted since the first tariff frame was transmitted to the chargeable subscriber unit exceeds a predetermined threshold value, the second tariff frame corresponding to a second tariff rate for at least a portion of the call.

2. A method according to claim 1, wherein the predetermined threshold value is a value corresponding to the first tariff rate.

3. A method according to claim 1 or 2, further comprising:

analyzing, before the first tariff frame is transmitted, a set of numbers dialed by the chargeable subscriber unit; and selecting the first tariff frame, determined for the set of numbers for transmission, wherein the telecommunication network is a public switched telephone network.

4. A radio system providing a wireless local loop, the radio system comprising:

at least one base station;

a chargeable subscriber unit connected to one of the at least one base station by radio frequency signals;

a subscriber network element transmitting calls between the chargeable subscriber unit and a telecommunication system through the one of the at least one base station, the subscriber network element comprising:

means for transmitting telecommunication signals between the telecommunication system and the chargeable subscriber unit;

a counter arranged in connection with the subscriber network element to count charge-metering signals transmitted by the telecommunication system; and a memory device arranged in connection with the subscriber network element to indicate a tariff frame corresponding to a set of numbers dialed by the chargeable subscriber unit, the subscriber network element further comprising means, responsive to the counter, arranged to retrieve from the memory device the tariff frame to be transmitted to the chargeable subscriber unit when a connection is established and when a monetary value, corresponding to a number of the charge-metering signals counted by the counter exceeds a predetermined threshold value.

5. A radio system according to claim 4, wherein the telecommunication system is the public switched telephone network.

6. A radio system according to claim 4 or 5, wherein the chargeable subscriber unit comprises:

a terminal equipment comprising a signal generator responsive to the tariff frame transmitted to the chargeable subscriber unit, for generating metering signals and for feeding the metering signals to a user interface, a number of the metering signals to be generated depending on the transmitted tariff frame.

7. A radio system according to claim 6, wherein the user interface is a pay phone.

8. A radio system according to claim 6, wherein the pay phone is operated by at least one of a coin and a credit card.

9. A radio system according to claim 4, wherein the predetermined threshold value is an amount corresponding to a value represented by the tariff frame.

10. A radio system according to claim 6, wherein the user interface is a telefax terminal.

11. A radio system according to claim 10, wherein the telefax terminal is operated by at least one of a coin and a credit card.

* * * * *